Aug. 25, 1936. E. O. P. THEGE 2,052,198
SUPERCHARGING DEVICE FOR INTERNAL COMBUSTION ENGINES
Filed Dec. 6, 1932 3 Sheets-Sheet 2
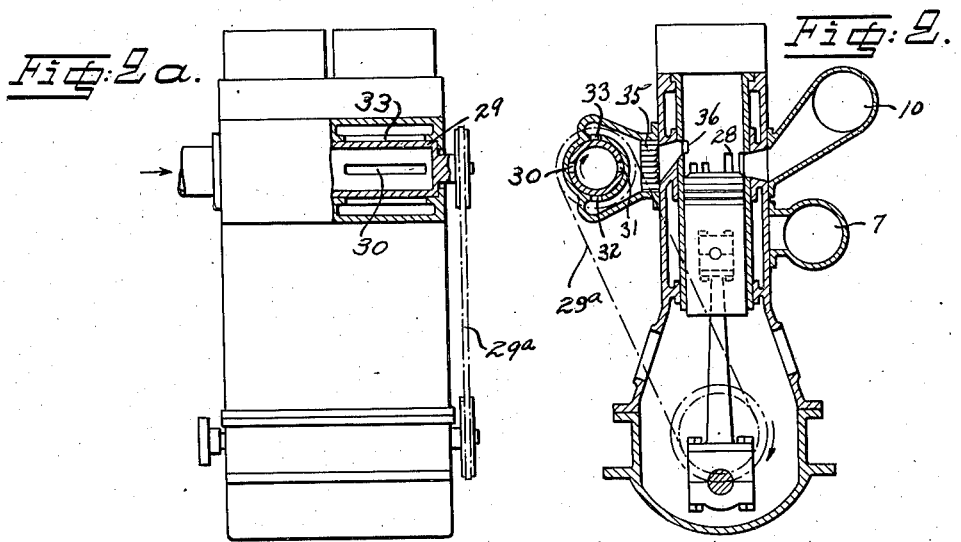
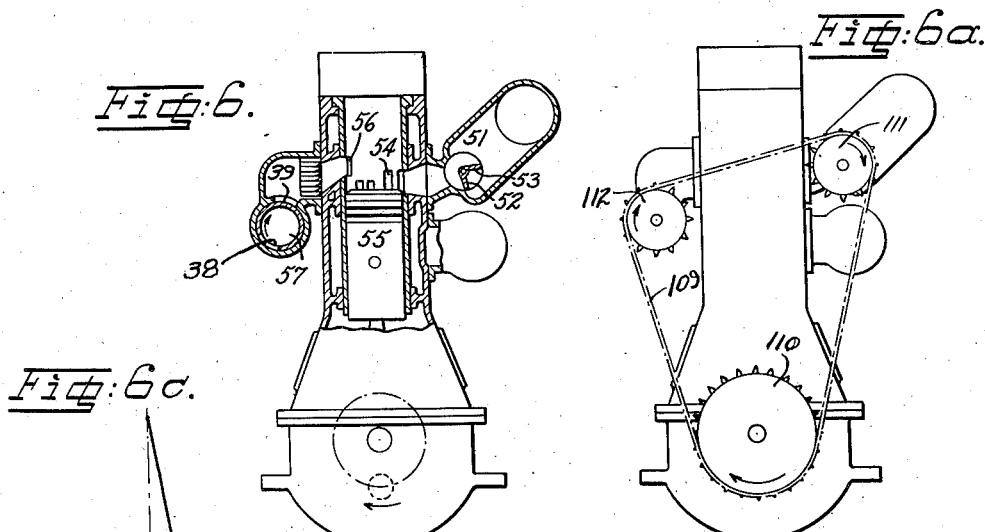
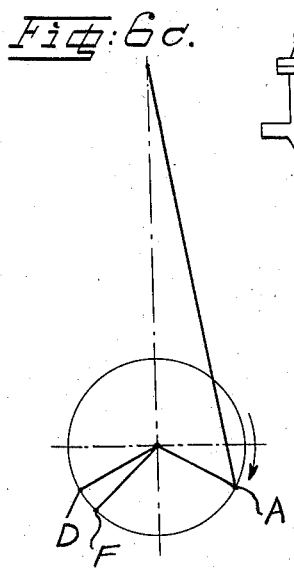
INVENTOR.
E. O. P. Thege
BY
Wm. J. Hedlund
his ATTORNEY.

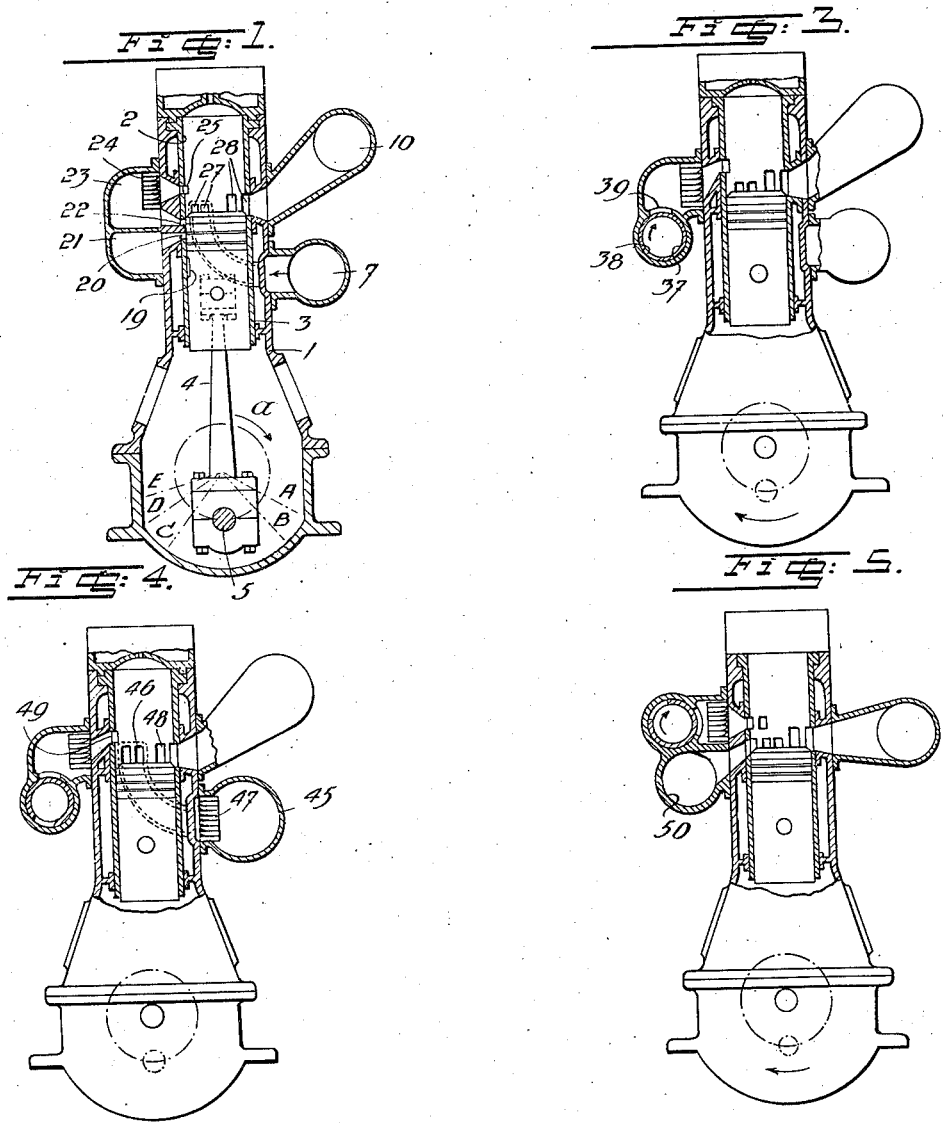

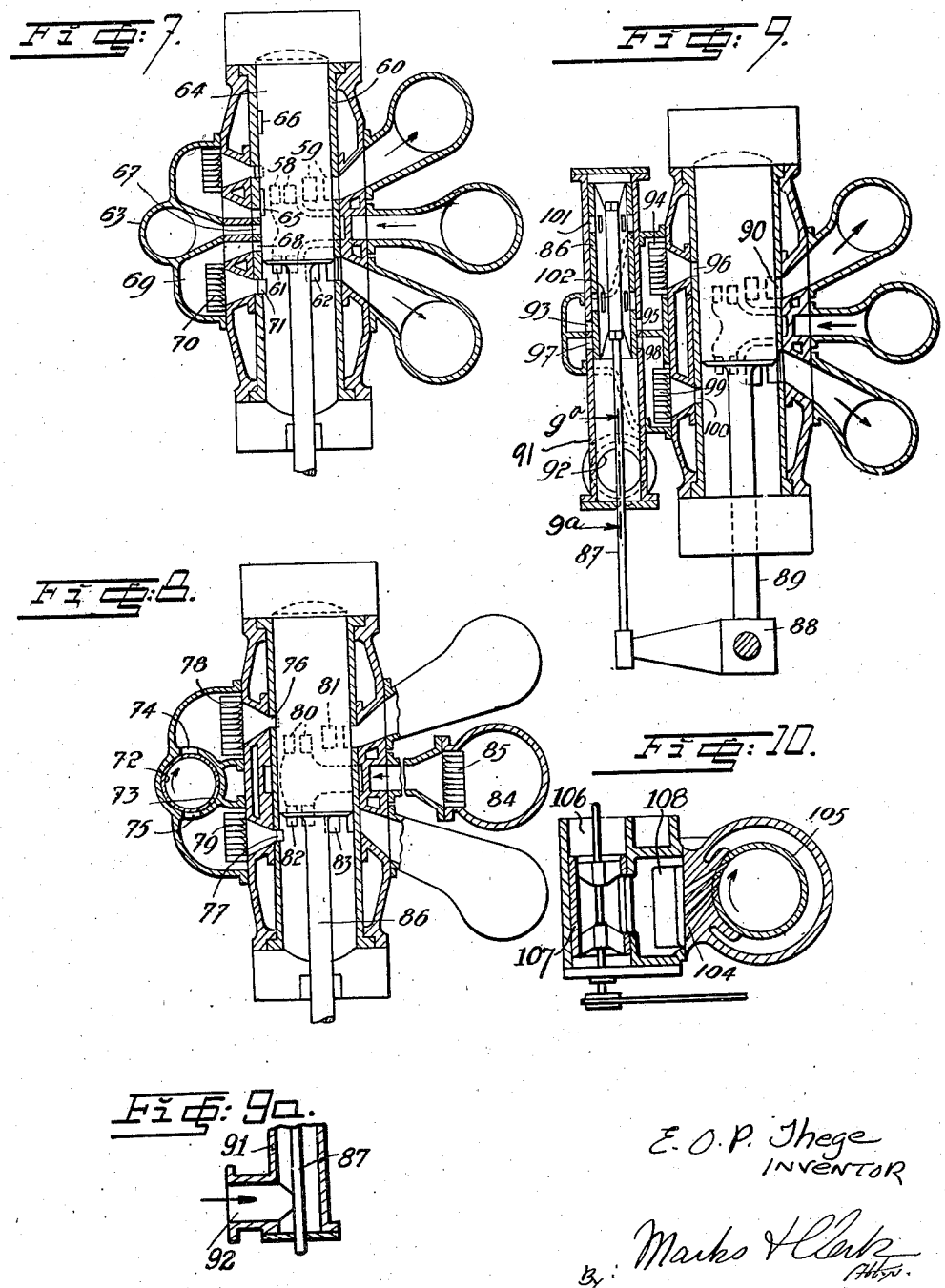

Patented Aug. 25, 1936

2,052,198

UNITED STATES PATENT OFFICE 2,052,198

SUPERCHARGING DEVICE FOR INTERNAL COMBUSTION ENGINES

Edvin Ossian Parcival Thege, Stockholm, Sweden, assignor to Aktiebolaget Atlas Diesel, Stockholm, Sweden, a corporation of Sweden Application December 6, 1932, Serial No. 645,977
In Sweden November 18, 1931

8 Claims. (Cl. 123—65)

The present invention relates to supercharging devices and has particular reference to supercharging devices for increasing the mean effective pressure in the working cylinder or cylinders of internal combustion engines of the two cycle type. The supercharging of the cylinder or cylinders is accomplished by admitting air of higher pressure than the comparatively low pressure scavenging air through an air inlet located above the scavenging ports.

In accordance with the present invention a member for controlling the admission of the supercharging air such for example as a reciprocating slide valve, rotary valve or the like is combined with an automatically acting valve located between the control member and the inlet in the cylinder for the supercharging air.

The automatically acting valve employed in conjunction with the invention is closed by the pressure of the combustion gases in the cylinder on the working stroke and by this arrangement the advantage is gained among others that the combustion gases are not permitted to reach the control member during the working stroke. Consequently this member is not subjected to possible injury from the high pressures or temperatures of the combustion gases.

The invention is capable of being embodied in different specific forms and in the accompanying drawings several embodiments of the invention have been shown by way of example.

In the drawings:

Fig. 1 is a more or less diagrammatic cross-sectional view of an engine embodying the invention;

Fig. 2 is a similar view of an engine provided with another embodiment of the invention;

Fig. 2a is a side elevation partly in section of the engine shown in Fig. 2;

Fig. 3 is an end elevation partly in section of still another embodiment of the engine embodying the invention;

Fig. 4 is a view similar to Fig. 3 showing still another form of the invention;

Fig. 5 is a view similar to Fig. 3 showing a further embodiment of the invention;

Fig. 6 is a view similar to Fig. 3 showing still another embodiment of the invention;

Fig. 6a is an end elevation of the engine shown in Fig. 6;

Fig. 6b is a view showing on an enlarged scale a part of the structure of Fig. 6;

Fig. 6c is a diagram relating to the engine shown in Fig. 6;

Fig. 7 is a section showing the cylinder of a double acting engine embodying the invention;

Fig. 8 is a view similar to Fig. 7 showing another arrangement for a double acting engine embodying the invention;

Fig. 9 shows still another arrangement of a double acting engine embodying the invention;

Fig. 9a is a section taken on the line 9a—9a of Fig. 9; and

Fig. 10 is a section showing a port arrangement for providing rotary movement of the supercharging air in the cylinder.

1, Fig. 1, is the frame of the engine, 2 is the lining of the working cylinder and 3 the piston or plunger, which is connected to the crank 5 of the engine shaft by means of the rod 4. The scavenging ports are designated by 27 and are supplied with compressed air from a receiver 7, which is charged with air by a special scavenging pump. The scavenging operation may, however, be effected by air supplied from the crank case (not illustrated in the drawings). The exhaust ports 26 communicate with an exhaust pipe 10.

The members of the engine just mentioned may be arranged as usual and the operation is such, that, as the ports 26 are uncovered by the piston 3 at the end of the working or expansion stroke, the combustion gases escape to the pipe 10, the cylinder being then scavenged by compressed air entering the cylinder through the ports 27 uncovered by the piston during its continued motion, which air then fills the cylinder and is later compressed.

It is assumed that the shaft of the engine is rotated in the direction indicated by the arrow a. In the port arrangement illustrated, the exhaust ports 26 are uncovered in the position A of the crank and the scavenging ports 27 in the position B of the crank. The scavenging ports are closed by the piston 3 in the position of the crank designated by C and the exhaust ports 26 are again closed in the position D of the crank.

The supercharging of the working cylinder with compressed air having a pressure greater than that of the scavenging air, is then effected, as the ports 26 have been closed. Supercharging consequently starts in the position D of the crank or immediately before or after the same. The supercharging air enters the cylinder through one or more ports 25. The supercharging action takes place between the position D of the crank and the position E of the same. As perceived, the velocity of the piston 3 is great during the angle D—E, owing to the fact that the crank 5 is very close to its middle position between the lower and upper dead centers. In order that the greatest possible quantity of supercharging air may have time to enter into the working cylinder during the short period which elapses between the positions D—E of the crank, the controlling member of the ports 25 is so arranged, that it is in motion before the moment at which it is opened. Owing to this fact the opening of the controlling member is effected especially rapidly and the supercharging air enters the working cylinder at full intensity from the starting of the period during which air rushes into the cylinder. This results in an increased supercharging of the working cylinder with the slightest possible loss of pressure of the supercharging air, which renders possible a greater mean pressure in the cylinder and greater efficiency of the engine. The member controlling the supercharging air may be constructed in many different manners for gaining the said object viz. that the controlling member is being in motion before the opening moment and the mean pressure in the cylinder is thereby increased.

In the embodiment shown in Fig. 1 the working piston 3 itself acts as the controlling member for the supercharging air. For the said purpose a cavity 19 is provided in the outer side of the piston, so that the piston operates also as a slide valve. The cavity 19 co-operates with ports 20, communicating with a receiver 21 of supercharging air supplied by a pump, and with ports 22, communicating with a chamber 23. The said chamber 23 is, through automatically acting valve 24, for instance of the construction disclosed in U. S. Letters Patent No. 1,672,436, put into and out of communication with the ports 25 for the entering of the supercharging air into the working cylinder 26. The scavenging ports 27 and exhaust ports 28 are arranged in the usual manner. The cavity 19 has such a position and such a length longitudinally of the piston, that, when the piston has covered the exhaust ports 28, the cavity starts in connecting the ports 20 with the ports 22, so that supercharging air passes from the receiver 21 into the chamber 23 and from the latter through the valve 24 and the ports 25 into the working cylinder.

Consequently, as perceived, the control member, that is, the working piston acting also as a slide valve, is in motion before the opening moment. Owing to this arrangement the opening action takes place very rapidly, which results in that a greater quantity of supercharging air without loss of pressure is introduced into the working cylinder 2 during the short period which is available before the rapidly moving working piston covers the ports 25, which takes place in the position E of the crank. The valve arrangement involves the least possible throttling of the air and resistance to the same. The air, which after the ports 25 have been closed, is confined between the working piston and the valve 24, serves to insulate the valve against the combustion gases.

During the downward movement of the working piston there is no risk of the automatically acting valve 24 being opened by the supercharging air, because the pressure in the cylinder then is always higher than the pressure of the supercharging air. At the same time that the exhaust ports 28 are uncovered by the working piston, the piston also interrupts the communication between the receiver 21 and the chamber 23 and consequently the supply of supercharging air to the valve 24. The compressed air confined in the chamber 23 will later, as the pressure in the working cylinder has been reduced, enter the working cylinder through the valve 24 and aid in the scavenging of the cylinder.

An advantage of the device shown in Fig. 1 resides in the fact that no special moving members are necessary for controlling the slide valve or the valve for the supercharging air and that the slide valve may be used for both rotary directions of the engine.

In the embodiment shown in Fig. 2 the controlling member for the supercharging air consists of a rotary slide valve 29, which is rotated by the shaft of the engine through a suitable motion transmitting device such as the chain drive illustrated diagrammatically at 29a and with the same number of revolutions as the shaft of the engine. The said slide valve, which is hollow and communicates with the receiver of the supercharging air, is provided with two openings 30 and 31, which are located diametrically opposite to one another and co-operate with two openings 32 and 33 respectively in the casing of the valve. 35 is an automatically operating valve, located between the rotary slide valve and the ports 36 for the supercharging air and adapted to withstand the pressure of the combustion gases. The scavenging ports and exhaust ports may be arranged as shown in Fig. 1.

The rotary slide valve 29 is rotated in the direction indicated by the arrow in the drawing and is so adjusted, that it is opened, as the crank of the engine is in the position D in Fig. 1. The rotary slide valve 29 may be provided with two openings, since it is of no importance, if the valve is opened also after it has been rotated through an angle of 180°, because the piston then covers the ports 36.

The embodiment shown in Fig. 3 differs from that shown in Fig. 2 substantially by the fact that the rotary slide valve 37 is provided with only one opening 38, co-operating with an opening 39 in the casing and that the valve is rotated through twice as great number of revolutions as the engine shaft. Also in this case the valve is opened in the position D, Fig. 1, of the crank.

In the scavenging devices shown in Figs. 1 to 3 inclusive no valves are provided at the scavenging ports. The present invention may, however, be combined with scavenging devices of that type, in which between the receiver 45 for the scavenging air, Fig. 4, and the scavenging ports 46, valves are provided, which according to the drawing consist of automatically acting valves 47. In such case the scavenging ports 46 may have the same height as the exhaust ports 48 or may be higher than the same, so that the scavenging operation is continued until the exhaust ports are covered by the working piston. 49 designate the ports for the supercharging air. Outside the same any one of the valve devices stated above may be provided for controlling the supercharging air, for instance a device of the construction shown in Fig. 3.

Fig. 5 illustrates the fact that the receiver 50 for the scavenging air may be located at the same side of the working cylinder as the valve device for the supercharging air without hindrance of the said valve device. The valve device may be constructed as shown in Figs. 2 or 3 and according to Fig. 5 it is arranged in the same manner as shown in Fig. 3.

For the gaining of an effective supercharging the same, evidently, ought to start as soon as the exit of the combustion gases has been closed, or somewhat earlier. Owing to the fact that in the embodiments of the invention stated above, the exit of the combustion gases is controlled by the exhaust ports proper, the supercharging operation may start only when the said ports have been closed. If, on the other hand, a special member—slide valve, damper or the like—is provided in the exit conduit for the combustion gases, the said member may be so controlled, that the closing of the exit conduit for the combustion gases is effected earlier, owing to which fact the supercharging operation may start at a correspondingly earlier moment. In Fig. 6 the provision of a damper 51 for the said purpose is shown as an example. The said damper is fixed to a shaft, rotated by the engine shaft, and, in order that the damper may close the exhaust conduit of the combustion gases rapidly it is advantageous that the number of revolutions of the damper be twice as great as that of the engine shaft. A drive giving this speed relation is shown diagrammatically in Fig. 6a in which the damper is driven by chain 109, crank shaft sprocket 110 having twice the diameter of the damper sprocket 111. In the embodiment shown in Fig. 6 the means for admitting the supercharging air into the working cylinder is the same as that shown in Fig. 3, the rotary valve being actuated by the chain-driven sprocket 112.

In order to avoid any throttling of the combustion gases at the commencing of the exhaust period the damper is made in the form of two wings 52 and 53 angularly located with respect to each other. The action of these wings is illustrated in Figs. 6b and 6c. In the diagram of Fig. 6c the point A indicates the position of the crank when the exhaust ports are uncovered on the working stroke of the piston. In this position of the crank the wings of the damper are in the dotted line positions indicated at 52a and 53a in Fig. 6b and it will be evident that in this position of the damper the exhaust is unobstructed.

On the diagram D represents the position of the crank when the exhaust ports are closed on the return stroke of the piston and during the movement of the crank from point A toward point D the damper moves from the dotted line position toward the full line position shown in Fig. 6b. The latter position of the damper is however reached when the crank arrives at position F, ahead of the closing of the exhaust ports on the return stroke of the piston. From this it will be evident that the exhaust passage is closed by the damper while the exhaust ports are still partially uncovered. As soon however as the exhaust passage is closed by the damper, supercharging may commence and for this reason the ports 56 may be made longer than would be possible if the damper were not employed. With the longer supercharging ports, supercharging can commence at an earlier period in the cycle and be continued for a longer period, thereby insuring a complete supercharging effect.

In Fig. 7 the invention is shown applied to a double-acting engine. The controlling device for the supercharging air is constructed in accordance with the embodiment shown in Fig. 1. 58 and 59 designate the scavenging and exhaust ports respectively of the top working chamber of the cylinder 60, and 61 and 62 are the scavenging and exhaust ports of the bottom working chamber of the cylinder. 63 is a receiver for the supercharging air common to both working chambers. The working piston 64 is shown in its upper position and the bottom chamber of the cylinder has been scavenged. In the outer side of the piston two cavities 65 and 66 are provided in such positions, that, when the exhaust ports 62 have been covered by the working piston, the cavity 65 connects the receiver 63 with the bottom working chamber, so that supercharging air passes through the ports 67, 68, cavity 65, chamber 69, valve 70 and the ports 71, supercharging of the bottom chamber being thus effected. When the top chamber has been scavenged through the ports 58, 59, the cavity 66 connects in an analogous manner the receiver 63 with this chamber.

Fig. 8 also shows a double-acting engine, in which supercharging of the top and bottom chambers of the cylinder is effected. The supercharging air is controlled by means of a rotary slide valve 72 analogous to the device illustrated in Fig. 3. The said valve is common to the top and bottom chambers of the cylinder and is provided with an opening 73, which co-operates with openings 74 and 75 provided in the wall of the casing. Automatically acting valves 78, 79 are provided between the rotary slide valve and the inlet ports 76, 77 for the supercharging air. Scavenging ports and exhaust ports of the top chamber are designated by 80 and 81, and the scavenging ports and the exhaust ports of the bottom chamber are designated by 82 and 83. An automatically acting valve 85 may be provided between the scavenging ports 80 and 82 and the receiver 84 of the scavenging air common to the same, whereby the scavenging ports may be made higher, as well known. Owing to the finite length of the connecting rod the opening of the rotary slide valve for admitting supercharging air into the top chamber differs somewhat from the opening of the said valve for admitting supercharging air into the bottom chamber. For that reason the rotary slide valve ought to be rotated with the same number of revolutions as the engine shaft.

Also other controlling devices for the supercharging air may, evidently, be used in the double-acting engines, for instance controlling devices of the construction shown in Figs. 5 and 6.

The rotary slide valves shown in Figs. 2, 3, 4, 5, 6 and 8 and also the damper shown in Fig. 6 may be rotated by the motor shaft through any known or suitable motion transmitting device, not shown.

Fig. 9 illustrates a double-acting engine arranged in accordance with the invention, in which the controlling of the supercharging air is effected by means of a reciprocating slide valve 86. The said slide valve, which may be hollow and open at its ends, as shown, is connected by means of its rod 87 to the cross head 88 of the piston rod 89. The working piston 90 is shown at its upper dead centre. The interior of the casing 91, which is closed at its ends, communicates with the receiver of the supercharging air through a pipe 92, as shown in Fig. 9a. In the wall 91 of the casing ports 93 are provided, which communicate with a passage 95 provided with an automatically acting valve device 94 and leading to supercharging ports 96 of the top chamber of the cylinder. Similar ports 97 communicate through a passage 98 and a valve device 99 with supercharging ports 100 of the bottom chamber of the cylinder. Ports 101 and 102 are provided in the slide valve in such positions, that, after the bottom chamber has been scavenged through scavenging and exhaust ports (not shown) of known or suitable construction, supercharging air is admitted into this chamber through the ports 102, 97, 100. Supercharging air is admitted in a similar manner into the top chamber of the cylinder through ports 101, 93 and 96.

If the supercharging device should operate also upon reversing of the rotary direction of the engine this may be effected, for instance by connecting the rotary slide valve, Figs. 2, 3, 5, 6 and 8, to a driving shaft by means of tongue and slot connection, in which the slot has such an extension peripherally, that, as the rotary direction of the shaft is reversed, the angular position suitable for the new rotary direction is imparted to the slide valve.

In Fig. 10 the receiver for supercharging air is designated at 106 and 107 indicates the rotary slide valve which controls the flow of air from the receiver. The automatically operating valve device, which may be of the same type as the valve devices shown in the remaining figures, is indicated at 108. The tangential ports or channels for admitting the supercharging air to the cylinder 105 are indicated at 104. Owing to this arrangement a rotating motion is imparted to the air in the cylinder, which continues also during the subsequent feeding of the fuel into the cylinder, which results in a more intimate mixture of air and fuel.

For the rotating of the rotary slide valves and also the damper mentioned above by the engine any suitable gearing may be used, for instance a chain gearing.

The invention may, evidently, be carried out in many other ways without exceeding the limits of the idea on which it is based.

I claim:

1. In an internal combustion engine of the two-cycle type, a working cylinder having an inlet port therein for admitting supercharging air to the cylinder, a piston in said cylinder, said piston controlling said port and having a recess in its side wall for controlling additional ports, a receiver for supercharging air, a passage connecting said receiver and said inlet port, said passage including ports adapted to be connected by said recess in certain positions of the piston for controlling flow of air from said receiver to said inlet port, and an automatic valve device located in said passage between said inlet port and the second mentioned ports and adapted to be closed by the pressure of the combustion gases in the cylinder when said inlet port is uncovered by the piston on its working stroke.

2. In an internal combustion engine of the two-cycle type, a working cylinder having a piston-controlled inlet port for admitting supercharging air to the cylinder, a receiver for supercharging air, a passage for conducting air from said receiver to said port, an engine actuated valve for admitting supercharging air to said passage at predetermined timed intervals, and an automatic valve device located in said passage between said valve and said port and adapted to be closed by the pressure of the combustion gases in the cylinder when said port is uncovered by the piston on its working stroke.

3. In an internal combustion engine of the two-cycle type, a working cylinder having one or more piston-controlled tangential inlet ports for admitting supercharging air to the cylinder, a receiver for supercharging air, a passage for conducting air from said receiver to said ports, mechanically actuated means for controlling flow of air through said passage, and an automatic valve device located in said passage between said ports and said means and adapted to be closed by the pressure of combustion gases in the cylinder when said inlet ports are uncovered by the piston on its working stroke.

4. In an internal combustion engine of the two-cycle type, a working cylinder having a piston-controlled exhaust port and a piston-controlled port for admitting supercharging air to the cylinder, a receiver for supercharging air, a passage for conducting air from said receiver to said inlet port, means for admitting air from the receiver to said passage at timed intervals, an automatic valve device located in said passage between said port and said means and adapted to be closed by the pressure of combustion gases in the cylinder when said inlet port is uncovered by the piston on its working stroke, an exhaust passage leading from said exhaust port, and a mechanically actuated valve for closing said exhaust passage before said exhaust port is closed by the piston on its compression stroke.

5. In an internal combustion engine of the two-cycle type, a working cylinder having a piston-controlled inlet port for admitting supercharging air and a piston-controlled exhaust port arranged to be closed later in the compression stroke of the piston than the closing of a portion of said inlet port, a receiver for supercharging air, a passage for conducting air from said receiver to said inlet port, means for admitting air from the receiver to said passage at timed intervals, an automatic valve device located in said passage between said port and said means and adapted to be closed by the pressure of combustion gases in the cylinder when said inlet port is uncovered by the piston on its working stroke, a passage leading from said exhaust port and a mechanically actuated valve for closing said exhaust passage before said exhaust port is closed by the piston on its compression stroke.

6. In an internal combustion engine of the two-cycle type, a working cylinder, a first receiver and a passage connecting said receiver and said cylinder for supplying scavenging air to the cylinder, a piston controlled inlet port in said cylinder, a second receiver for supplying to the cylinder air for supercharging at a pressure higher than the pressure of the scavenging air, a passage connecting said second receiver and said port, means for controlling flow of air from the second receiver to said port and an automatic valve device located in said passage between said means and said port and adapted to be closed by the pressure of the combustion gases produced in the cylinder on the working stroke, whereby to prevent flow of said gases from said port to said means when the port is uncovered by the piston on said working stroke.

7. In an internal combustion engine of the two-cycle type, a working cylinder, a first receiver and a passage connecting said receiver and said cylinder for supplying scavenging air to the cylinder, a piston controlled inlet port in said cylinder, a second receiver for supplying to the cylinder air for supercharging at a pressure higher than the pressure of the scavenging air, a second passage connecting said second receiver and said inlet port, mechanically actuated means for admitting air to said second passage from said second receiver at predetermined timed intervals, and an automatic valve device located in said second passage between said mechanically actuated means and said inlet port and adapted to be closed by the pressure of the combustion gases in the cylinder when said inlet port is uncovered by the piston on its working stroke.

8. In an internal combustion engine of the two-cycle type, a working cylinder, a first receiver and a passage connecting said receiver and said cylinder for supplying scavenging air to the cylinder, a second receiver for supplying to the cylinder air for supercharging at a pressure higher than the pressure of the scavenging air, a piston in the cylinder, a piston controlled inlet port in the cylinder, a second passage including additional ports controlled by said piston for conducting supercharging air from said second receiver to said inlet port at predetermined timed intervals, and an automatic valve device located in said second passage between said inlet port and said additional ports and adapted to be closed by the pressure of the combustion gases in the cylinder when said inlet port is uncovered by the piston on its working stroke.

EDVIN OSSIAN PARCIVAL THEGE.